United States Patent [19]
Kohtz et al.

[11] Patent Number: 5,291,588
[45] Date of Patent: Mar. 1, 1994

[54] CONTROL SYSTEM AND METHOD FOR MULTIPLE RATE DISK DRIVE DATA TRANSFER WITH A SINGLE OSCILLATOR

[75] Inventors: Robert A. Kohtz, St. Joseph; Mark D. Nicol, Stevensville, both of Mich.

[73] Assignee: Zenith Data Systems Corporation, Buffalo Grove, Ill.

[21] Appl. No.: 455,818

[22] Filed: Dec. 18, 1989

Related U.S. Application Data

[63] Continuation of Ser. No. 208,354, Jun. 17, 1988, abandoned.

[51] Int. Cl.$^5$ ............................................... G06F 3/00
[52] U.S. Cl. ............................ 395/550; 364/DIG. 2; 364/934; 364/934.2
[58] Field of Search ............................ 360/43, 51; 395/DIG. 1 MS File, DIG. 2 MS File, 550, 800

[56] References Cited

U.S. PATENT DOCUMENTS 4,494,196 1/1985 Greer .................................. 364/200
4,651,277 3/1987 Sakaji ................................. 364/200

Primary Examiner—Robert B. Harrell
Attorney, Agent, or Firm—Leydig, Voit & Mayer

[57] ABSTRACT

A computer disk drive control adapts the rate of data transfer between a disk drive and a CPU to correspond to one of three industry standard transfer rates. The timing of disk controller signals is provided for by a two phase state machine that receives a signal representative of a selected data transfer rate and generates disk controller signals of the appropriate frequency and configuration. Such disk controller signals cause a disk controller to effect data transfer at the selected rate. In a preferred embodiment, the two phase state machine is driven by two opposite phases of a single 24 MHz clock.

10 Claims, 4 Drawing Sheets

CONTROL SYSTEM AND METHOD FOR MULTIPLE RATE DISK DRIVE DATA TRANSFER WITH A SINGLE OSCILLATOR

This application is a continuation of application Ser. No. 208,354, filed Jun. 17, 1988, now abandoned.

BACKGROUND OF THE INVENTION

This invention relates generally to the computer disk drive art. In particular, the present invention pertains to a method of achieving multiple data transfer rates in floppy disk drive controllers for industry standard compatibility.

Disk drive controllers, sometimes referred to as input/output (I/O) processors, control the operation of the disk drive. The disk drive controller board is located in the mainframe of the computer and is responsible for the control, monitoring, and overall operation of the floppy disk drive device. The concept of disk drive control by the means of a disk drive controller board is an accepted industry standard and has proven to be a highly efficient method of disk drive operation. In earlier systems, disk drive control had been the responsibility of the main Central Processing Unit (CPU). The use of a separate controller board frees the CPU from this mundane task allowing the CPU to attend to other duties and commands, thereby enhancing overall system operating speed.

The disk drive controller board configuration also allows for faster storage access times. The function of the floppy disk drive is to store (write) to a disk data present in the main memory (typically random access memory (RAM)) and to retrieve (read) data from a disk to be loaded into the RAM main memory. The rate or speed at which the disk drive reads or writes the information (data) to or from the floppy disk is referred to as the data transfer rate, expressed in bits per second (b/s) or as a frequency. The data transfer rate and the read/write commands are controlled by the disk drive controller.

Floppy disk drives have evolved from the low density data storage devices of earlier computer systems to the much higher density storage devices of current production computers. The data density of a floppy disk is defined as the number of bits that can be stored in a given length of recording surface.

The performance of floppy disks and disk drive devices has increased as the industry and technology have continued to evolve. As disk drive performance, floppy disk manufacturing techniques, and data storage techniques have improved the industry standards have changed accordingly. Most importantly, read and write speed frequencies have increased primarily because of an increased disk storage capacity resulting from a higher packing density of data. Disk drive transport speeds have changed slightly which has altered the format encoding scheme of the disk. These industry changes have created certain incompatibilities between newer and older systems. As an example of incompatibility, data written to a disk at the rate of 250 kHz cannot be read at the rate of 500 kHz. Though all of the data bits would be present on the disk, the space or area between the bits would appear to be twice as large with a read rate of 500 kHz. The result is a spatial differential ratio arising from the ratio of the read rate to the write rate. For this reason, a method was required to accommodate the changes in industry standards while maintaining compatibility.

An earlier method of achieving multiple data transfer rates involved the employment of numerous switched or independent oscillators. Each independent oscillator would be fixed for a particular rate of data transfer. On command from the disk drive controller or the CPU, the control circuitry would "switch" to the oscillator required for the needed transfer rate. This switching action would often result in a sharp increase of static electronic modulation (a switching "spike") and could affect the control circuitry with unwanted asynchronous signals. Unless extensive filtering networks were employed, increased radio frequency interference could result. Also, timing delay and frequency phase correction circuitry was required to control the asynchronous signals present with this method. The additional components, separate oscillators and the respective supporting circuitry further resulted in an increased cost to accomplish the desired result.

The present invention is intended to provide a method of selecting different data transfer rates in a unique manner, allowing full compatibility with the established industry standard data transfer rates without a need for different independent frequency oscillators.

SUMMARY OF THE INVENTION

Accordingly, it is a principal object of the present invention to provide an improved disk control system that generally overcomes the deficiencies of the prior art.

It is another principal object of the present invention to provide a method of selecting electronically, the appropriate data transfer rate to maintain compatibility with the subject storage data.

It is another object of the present invention to provide a means and method of selecting a data transfer operating frequency for an appropriate data transfer rate without the need for independent frequency oscillators.

A further object of the present invention is to accomplish the task of data transfer rate selection without increasing radio frequency interference.

Still another object of the present invention is to achieve a method of data transfer rate selection without decreasing the limited available space within a computer mainframe.

The above and other objects are accomplished by a disk drive control system that adapts the rate of data transfer between a CPU and a disk drive to correspond to a selected transfer rate and has a state machine driven by one clock signal that generates a set of intermediate signals synchronous with that clock signal, another state machine driven by an opposite phase clock signal that generates another set of intermediate signals synchronous with that opposite phase clock signal and means for combining intermediate signals of both sets so as to create disk drive control signals corresponding to the selected data transfer rate.

BRIEF DESCRIPTION OF THE DRAWINGS

The appended claims set forth those novel features believed characteristic of the invention. The invention itself may be further understood by reference to the detailed description of a preferred embodiment taken in conjunction with the accompanying drawings, where like following reference characters identify like elements throughout the various figures, and in which:

DETAILED DESCRIPTION OF THE PREFERRED EMBODIMENT

Figure 1:
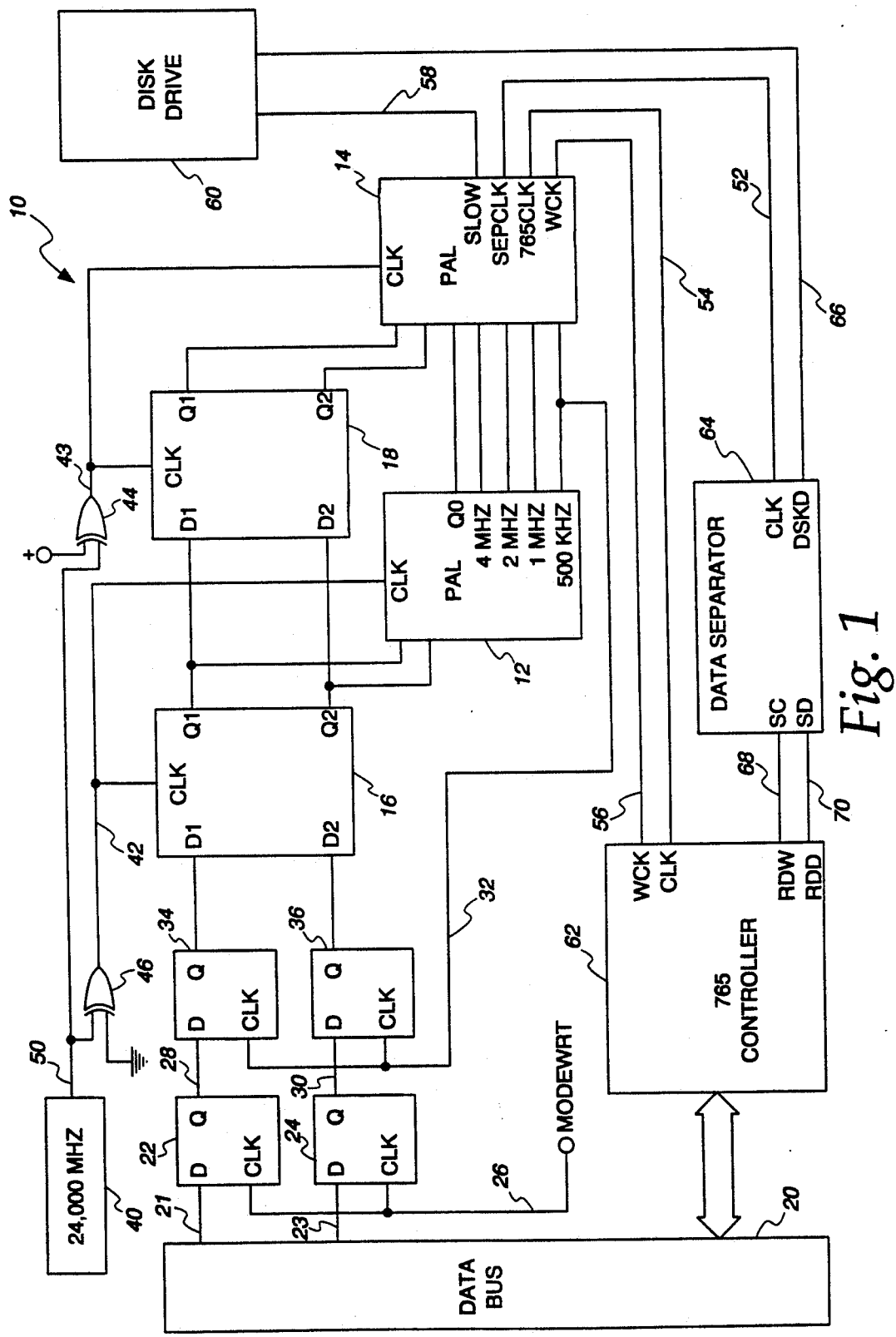
FIG. 1 illustrates, in schematic form, data transfer rate and frequency selection control circuitry in accordance with a preferred embodiment of the present invention.

Generally a preferred embodiment of the present invention provides a means and method for multiple data transfer rates through control of appropriate disk drive circuitry. Referring now to FIG. 1, there is shown in schematic form the data transfer rate and frequency selection control circuitry of a disk drive controller board 10 in accordance with the present invention.

In the embodiment of FIG. 1, data transfer rate selection is made possible by the employment of two high speed bipolar state machines contained within two programmable array logic (PAL) integrated circuits 12 and 14. The PALs 12, 14 are connected in parallel and comprise a two phase state machine, the internal programming and operation of which effect control and selection of a desired data transfer rate. Selection of a data rate is dependent upon the input to the PALs 12, 14 from mode control flip-flops 16 and 18. The appropriate input to the PALs 12, 14 is a function of operating system software and originates with an I/O write command. When the CPU accesses a port, via a software command, the data of that port includes information concerning the data transfer rate required to access a disk drive. This data enters the disk drive controller board 10 through a data bus 20. It is the two least significant bits of the data on the bus 20 that determine the data transfer rate. The least significant data bit on a line 21 is input to a D flip-flop 22, and the second least significant data bit on a line 23 is input to a D flip-flop 24. Together, the flip-flops 22, 24 cooperate to latch the selected data transfer rate.

A signal "MODEWRT" received on a line 26 represents the mode write port decode and is used to clock the data from the bus 20 through to the Q outputs of flip-flops 22 and 24 on lines 28 and 30 respectively. A 500 kHz clock signal on a line 32 provides a clock signal to another set of D flip-flops 34 and 36 which receive at their inputs the Q outputs of flip-flops 22 and 24 on lines 28 and 30 respectively. The first PAL 12 provides the 500 kHz clock signal on line 32 to synchronize the data transfer rate data input from the asynchronous bus 20. This prevents a data rate change in the middle of an already executing cycle.

The Q outputs of flip flops 34 and 36 provide inputs D1 and D2 to the first mode control flip-flop 16. Data output Q1 and Q2 from the flip-flop 16 form inputs D1 and D2 to the second mode control flip-flop 18. The Q1 and Q2 outputs from flip-flop 16 also provide data input to the first PAL 12. The Q1 and Q2 outputs of the second mode control flip-flop 18 provide data input to the second PAL 14.

The two phase state machine of the present invention is driven by a 24 MHz square wave clock. The clock signal directly drives the first PAL 12 and its associated mode control flip-flop 16, while an inverted version of the clock signal drives the second PAL 14 and its mode control flip-flop 18. The two phases of the clock are achieved by passing the 24 MHz clock signal from the 24,000 MHz oscillator circuit 40 through a pair input exclusive OR (XOR) gates 44 and 46. The 24 MHz signal on a line 50 forms one input to each of the XOR gates 44 and 46. The other input of the first XOR gate 44 is held at a constant logic high level. The second input of the second XOR gate 46 is held at a constant logic low level. This results in an inverted 24 MHz clock signal output on a line 43 from XOR gate 44 which is used to clock the second mode control flip flop 18 and the second PAL 14. The output of XOR gate 46 on a line 42 is the non-inverted 24 MHz clock signal which is used to clock the first mode control flip-flop 16 and the first PAL 12. Using a pair of XOR gates in this manner ensures a minimum of skew between the two clock phases.

When input data representing the chosen data transfer rate is present at the first PAL 12 and the second PAL 14, the two phase state machine propagates. The state machine uses logic state conditions to select or alter certain frequencies. This is accomplished by the configuration of the input data when compared to a logic state condition. If the input data configures to a logic state condition, it changes to another state for further comparison. As each logic state condition is satisfied, commands are issued that divide, delay, manipulate, and blend the opposite phase 24 MHz clock into the desired data transfer frequency that is selected by the input data configuration on lines 21 and 23.

This is the means and method by which data transfer rate frequencies are selected without the need of additional and independent oscillators. The result is a data rate frequency that is free of the electronic static modulation that would otherwise be present when switched oscillators are utilized. This method also eliminates the need for additional timing delay circuitry that would otherwise be required in a system employing switched oscillators to maintain the proper phase relationship of selected frequencies.

During the propagation of the state machine, the second PAL 14 outputs a "SEPCLK" signal on a line 52, a "765CLK" signal on a line 54, and a "WCK" signal on a line 56. The frequencies of these signals change with the selection of one of three industry standard data transfer rates available to accommodate the varying disk storage capacities. The relationship of data transfer rates to data storage capacities, with their respective drive rotation speeds, is shown in Table 1.

TABLE 1

| Data Transfer Rate | Data Storage Capacity | Drive Rotation Speed |
|---|---|---|
| 250 kHz | 360 KB | 300 RPM |
| 300 kHz | 360 KB | 360 RPM |
| 500 kHz | 1.2 MB (Formatted) | 360 RPM |

In the event the selected transfer rate is 250 kHz, a "SLOW" signal on a line 58 is output from PAL 14 and input directly to the disk drive 60 and is used to reduce the disk drive's speed of rotation. The disk drive speed of rotation for both the 500 kHz and 300 kHz data transfer rates is 360 revolutions per minute (RPM). The disk drive speed of rotation for the 250 kHz data transfer rate is 300 RPM. When used with a fixed spindle speed, high density drive, the "SLOW" signal is used to adjust the bias level on the head for whatever type of media is encountered.

The "WCK" signal on line 56 is input to a 765 disk controller integrated circuit 62. The "WCK" signal instructs the controller 62 as to the speed (frequency) to write data to maintain compatibility with the data transfer rate currently selected. The "765CLK" signal on line 54 is also input to the controller 62. The "765CLK" signal establishes the controller 62 operating or processing speed with respect to the "WCK" signal on line 56. The "SEPCLK" signal on line 52 is a separator clock signal the frequency of which is a result of the data transfer rate selected. The "SEPCLK" signal is input to a data separator 64.

Data separator 64 receives raw data and clock pulses from the disk drive 60 on a line 66. The data separator 64 separates the magnetic flux changes read from the disk into separate clock and data streams, using the "SEPCLK" signal on line 52 to synchronize the digital data bit stream. Data separator 62 outputs on a line 68 a separated clock signal which is input to the controller 62. Data separator 62 further outputs on a line 70 a serial synchronized data bit stream derived from the disk's raw data on line 66. The bit stream on line 70 is input to the controller 62. The controller 62 converts the serial data bit stream on line 70 into parallel data and outputs it to the data bus 20. The data is then input to the CPU where it is processed.

Figure 2:
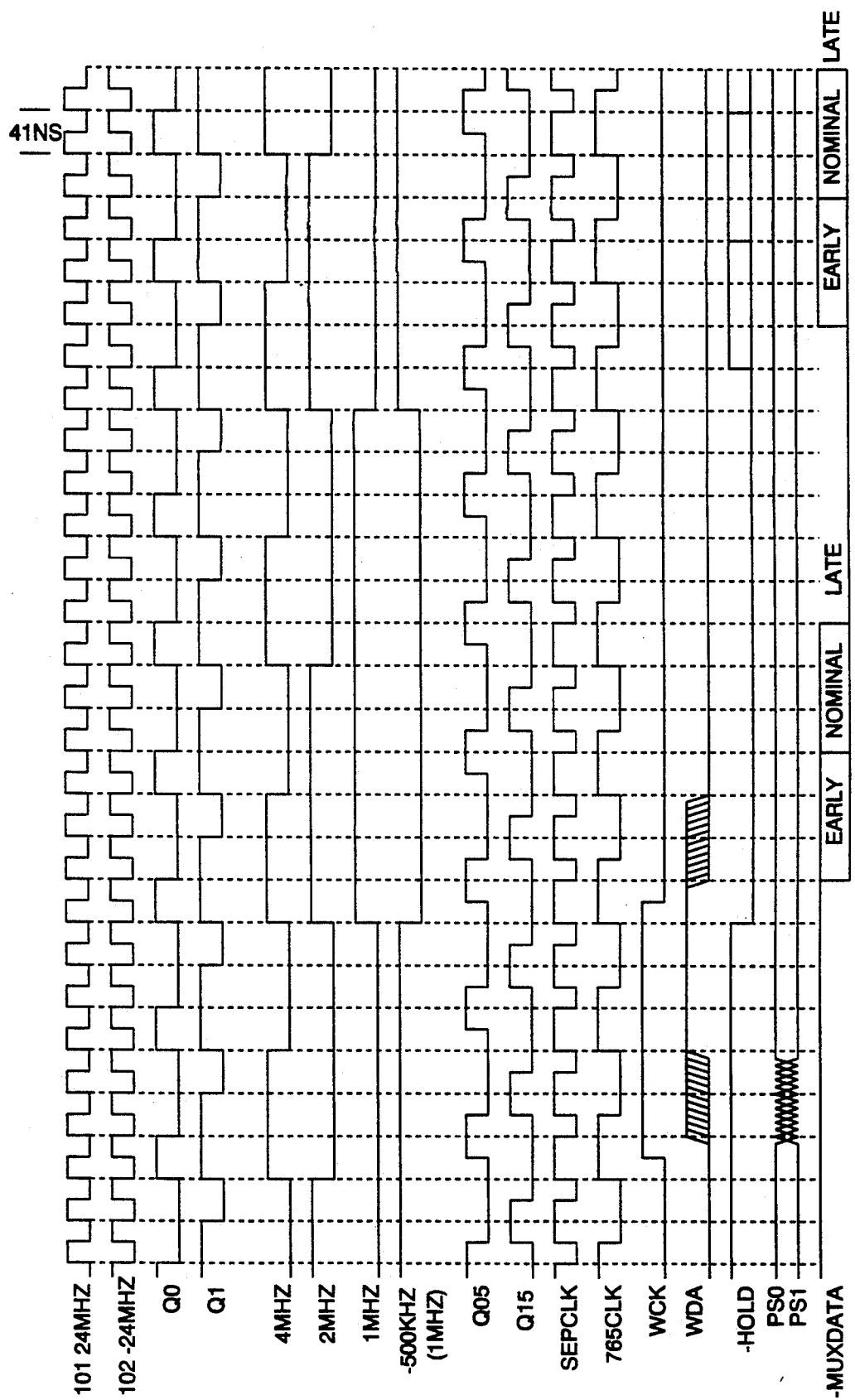
FIG. 2 shows in timing diagram form the clock pulse timing events for 500 kHz data transfer rate in accordance with the present invention.
Figure 3:
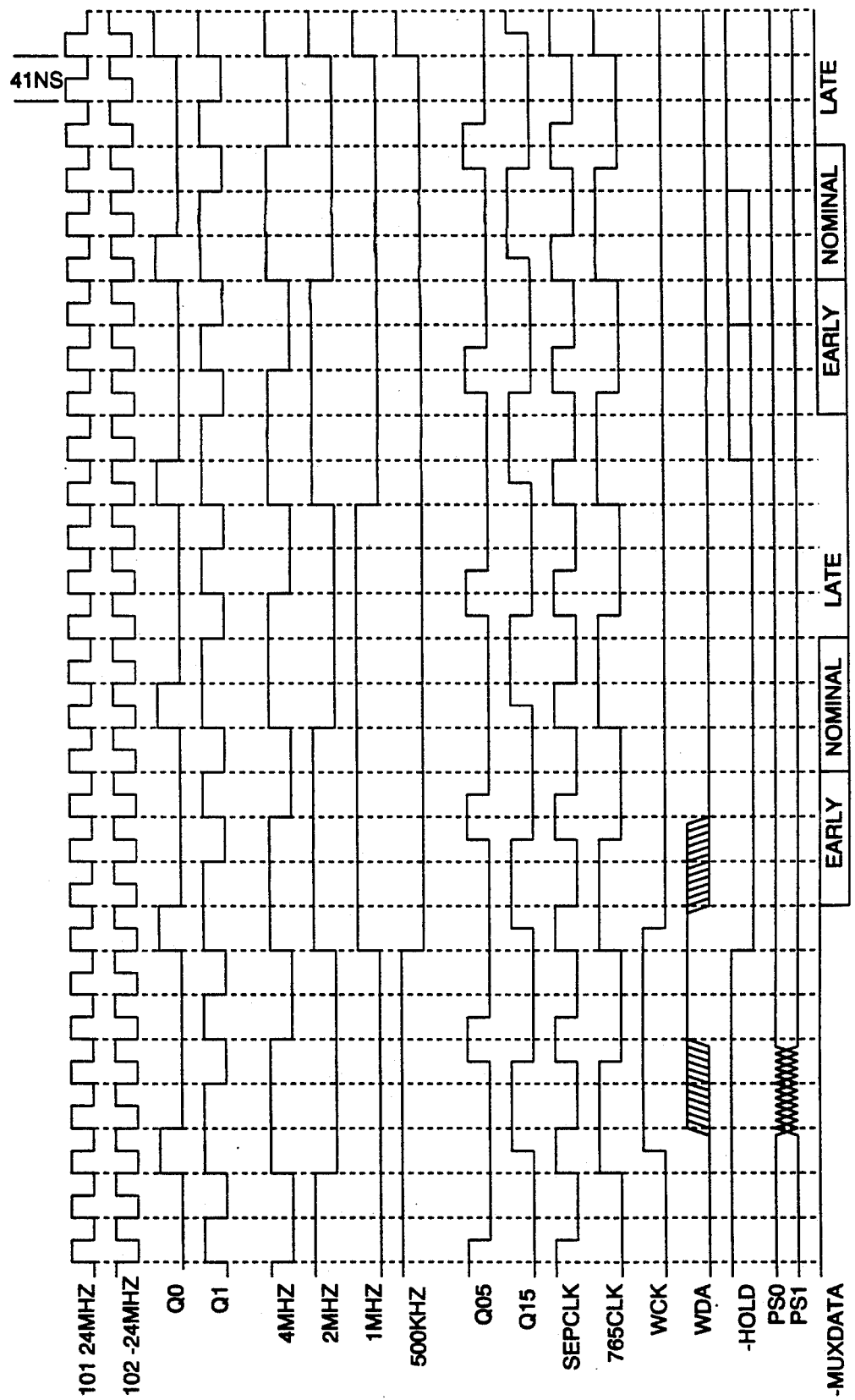
FIG. 3 shows in timing diagram form the clock pulse timing events for a 300 kHz data transfer rate in accordance with the present invention.
Figure 4:
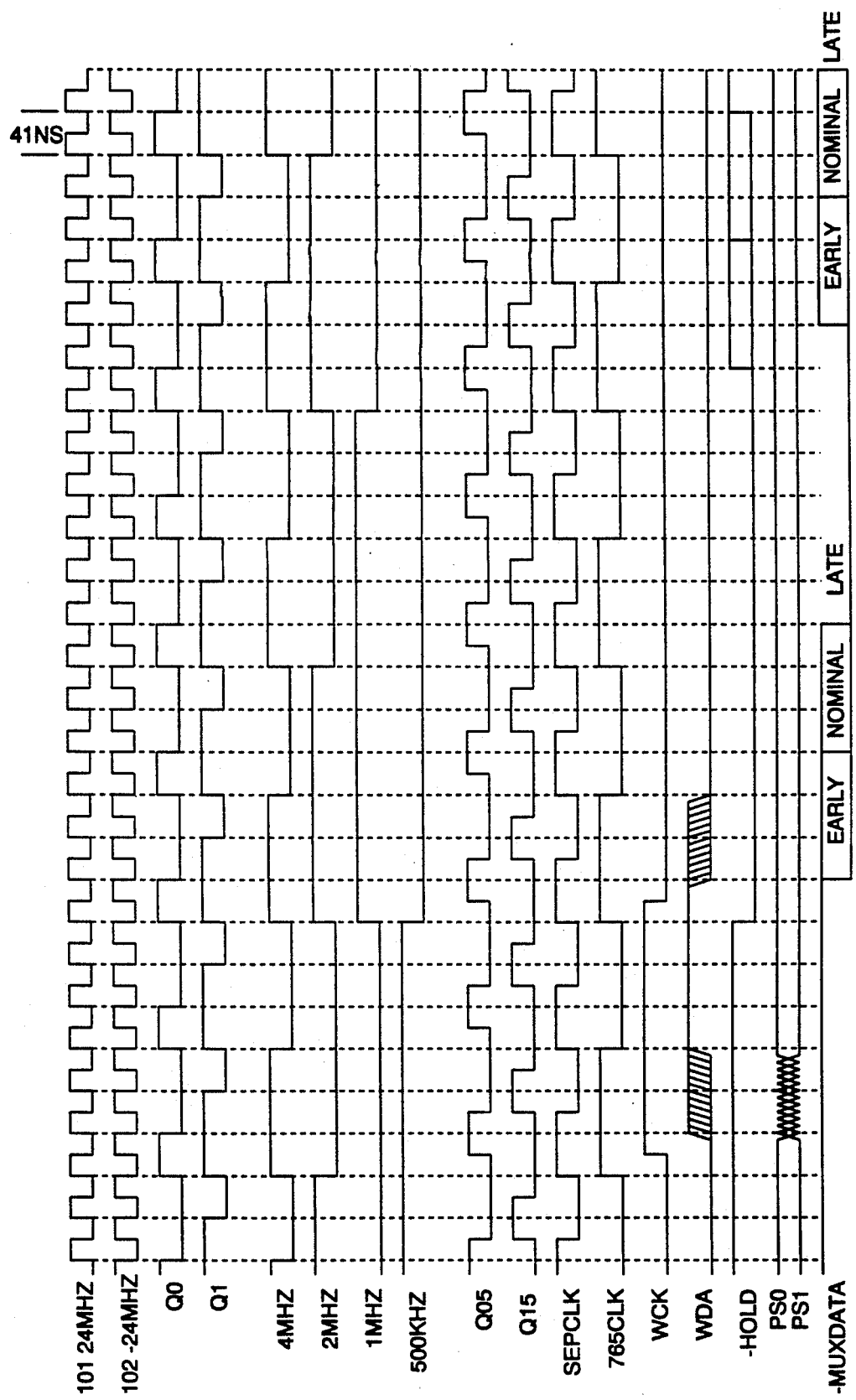
FIG. 4 shows in timing diagram form the clock pulse timing events for a 250 kHz data transfer rate in accordance with the present invention.

Referring to FIG. 2, FIG. 3 and FIG. 4, there is shown in timing diagram form the clock pulse timing events for the 500 kHz, 300 kHz and 250 kHz data transfer rates, respectively. The non-inverted and inverted 24 MHz clocks are shown at 101 and 102 respectively. These clock signals 101, 102 are blended by the parallel PALs 12 and 14 to generate state signals Q0, Q1, Q05 and Q15. These state signals are required for the division, delay and manipulation necessary to achieve the three distinct data transfer rates produced by the operation of the state machine.

The first PAL 12 divides the 24 MHz clock signal 101 into 4 MHz, 2 MHz, 1 MHz, and 500 kHz signals which are used to generate the correct timing for the ultimately needed disk control signals with longer clock periods. State signals Q05 and Q15, generated from the inverted 24 MHz clock, effectively double the timing resolution normally available from a single phase clock. This increased resolution allows the generation of normally unattainable frequencies, such as 16 MHz, which are not evenly divisible from a 24 MHz signal. The "SEPCLK" signal is the data separator clock and is of a frequency that corresponds to the particular chosen data transfer rate The "765CLK" signal is the operating clock of the controller 62 and regulates the speed that the controller 62 processes, relative to the selected data transfer rate.

The "WCK" signal is the write clock of the controller 62 and regulates the controller's write speed with respect to the data transfer rate selected. The "WDA" signal is the write data signal from the controller to the first PAL 12 and is used to write data to the disk drive 60. The signals "PS0" and "PS1" are the precomp code signals and are used to select whether the data will be written to the drive early, late, or normally. The clock frequencies illustrated in FIG. 2, FIG. 3 and FIG. 4 illustrate how the disk drive control signals vary depending upon the selected data transfer rate. The control signals "SEPCLK", "765CLK" and "WCK" from the second PAL 14 are the result of the state machine selection, based on data input, and are the inputs to the controller 62 which allows the disk drive controller 10 to access the disk drive 60 at the selected data transfer rates.

Referring specifically now to FIGS. 2, 3 and 4, there are shown three sets of timing signals corresponding to data transfer rates of 500, 300 and 250 kHz respectively. Which set of timing signals will be generated depends upon the selected data transfer rate which itself is a function of the two least significant data bits present on lines 21 and 23 in FIG. 1 as described above. The correlation between the data present on lines 21 and 23 and the selected data transfer rate of the preferred embodiment is shown in Table 2.

TABLE 2

| Second Least Significant (line 23) | Least Significant (line 21) | Data Transfer Rate |
|---|---|---|
| 0 | 0 | 500 kHz |
| 0 | 1 | 300 kHz |
| 1 | 0 | 250 kHz |

FIGS. 2, 3 and 4 show numerous intermediate signals generated by the PALs 12, 14 from the 24 MHz clock 101 and the inverted 24 MHz clock 102. These intermediate signals are ultimately used to create the controller timing signals "SEPCLK", "765CLK" and "WCK." The 4 MHz, 2 MHz, 1 MHz and 500 kHz signals are divisions of the 24 MHz clock created in the state machine of the first PAL 12 according to the following logic equations:

$$4MHz = (!Q1 * !4MHz) + (Q1 * 4MHz)$$

$$2\text{ MHz} = (!Q1 * !4\text{ MHz} * !2\text{ MHz}) + \\ (4\text{ MHz} * 2\text{ MHz}) + \\ (Q1 * 2\text{ MHz})$$

$$1\text{ MHz} = (!Q1 * !4\text{ MHz} * !2\text{ MHz} * !1\text{ MHz}) + \\ (2\text{ MHz} * 1\text{ MHz}) + \\ (4\text{ MHz} * 1\text{ MHz}) + \\ (Q1 * 1\text{ MHz})$$

For the 300 and 250 kHz data transfer rates:

$$500\text{ kHz} = (!Q1 * !4\text{ MHz} * !2\text{ MHz} * !1\text{ MHz} * !500\text{ kHz}) + \\ (4\text{ MHz} * 500\text{ kHz}) + \\ (2\text{ MHz} * 500\text{ kHz}) + \\ (1\text{ MHz} * 500\text{ kHz})$$

For the 500 kHz data transfer rate:

$$500\text{ kHz} = (!Q1 * !4\text{ MHz} * !2\text{ MHz} * !1\text{ MHz} * !500\text{ kHz}) + \\ (4\text{ MHz} * 500\text{ kHz}) + \\ (2\text{ MHz} * 500\text{ kHz}) +$$

In the above equations and throughout, logic symbols are defined as follows:

! is a logic "NOT"

+ is a logic "OR"

\* is a logic "AND"

Q0 and Q1 are intermediate state variables generated by the state machine of the first PAL 12 which is driven by the 24 MHz clock 101. The logic equations for Q0 and Q1 are given below:

$Q0 = !Q1$ (for the 500 and 250 kHz rates)

$Q0 = !Q1 * !4MHz$ (for the 300 kHz rate)

$Q1 = (!Q0 * !Q1) + Q0$

Q05 and Q15 are also intermediate state variables, but are generated by the state machine of the second PAL 14 which is driven by the inverted 24 MHz clock 102. Since the second PAL 14 is driven by a clock of opposite phase with respect to the clock of the first PAL 12, the state transitions of Q05 and Q15 are similarly of opposite phase with respect to the transitions of the variables of the first PAL 12. It is the opposite phase transitions of the state variables of the second PAL 14 that provide twice the timing resolution of a single phase state machine. As will be described below, this increased resolution is necessary to be able to create three different sets of controller timing signals corresponding to the three standard data transfer rates of 500, 300 and 250 kHz. The logic equations for Q05 and Q15 are given below:

$Q05 = !Q05 * !Q15$ (for the 500 and 250 kHz rates)

$Q05 = Q15 * Q25$ (for the 300 kHz rate)

$Q15 = Q05$ (for the 500 and 250 kHz rates)

$Q15 = !Q25$ (for the 300 kHz rate)

where:

$Q25 = Q05 + Q15$

Having defined intermediate state variables, it is now possible to define the controller timing signals which are synthesized by combining the intermediate state variables. The "SEPCLK" signal as shown in FIGS. 2, 3 and 4 is defined as follows:

$SEPCLK = Q0 + Q05$ (for the 300 and 250 kHz rates)

$SEPCLK = Q0 + Q15$ (for the 500 kHz rate)

The "765CLK" signal is defined as follows:

$765CLK = 4MHz$ (for the 250 kHz rate)

$765CLK = Q0 + Q15$ (for the 300 kHz rate)

$765CLK = Q0 + Q05$ (for the 500 kHz rate)

Finally, the "WCK" signal is defined as follows:

$WCK = !2MHz * !1MHz * !500 kHz$

As can be seen from FIGS. 2, 3 and 4, the controller signals "SEPCLK", "765CLK" and "WCK" can change state either synchronously with the 24 MHz clock 101 or of opposite phase with respect thereto. This feature is necessary to be able to tailor the controller signals to the needs of any particular selected industry standard data transfer rate, and this feature is provided for by the two phase state machine described herein.

There has been shown an improved method of selecting three industry standard disk drive data transfer rates without the employment of separate and independent frequency oscillators. The present invention accomplishes this task by the use of a two phase logic state machine contained within two parallel PAL devices while causing no increase in RFI.

While particular embodiments of the invention have been shown and described, it will be obvious to those skilled in the art that changes and modifications may be made without deporting from the invention in its broader aspects and, therefore, the aim in the appended claims is to cover all such changes and modifications as fall within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

We claim:

1. In a computer system having a CPU and a disk drive, means for adapting different rates of data transfer between the CPU and the disk drive to correspond to a selected data transfer rate comprising:
   means for generating a first clock signal and a second clock signal, said first clock signal and said second clock signal being derived from a single oscillator;
   first logic means drive by said first clock signal for generating a first set of intermediate signals synchronous with said first clock signal;
   second logic means driven by said second clock signal for generating a second set of intermediate signals synchronous with said second clock signal, said second logic means being operable in parallel with said first logic means; and
   means for combining signals of said first set of intermediate signals and said second set of intermediate signals to create disk drive control signals corresponding to the selected data transfer rate.

2. In a computer system having a CPU and a disk drive, means for adapting different rates of data transfer between the CPU and the disk drive, as recited in claim 1, wherein said first clock signal and said second clock signal are of like frequency and opposite phase.

3. In a computer system having a CPU and a disk drive, means for adapting different rates of data transfer between the CPU and the disk drive, as recited in claim 1, wherein said first clock signal and said second clock signal are 24 MHz square wave signals.

4. A method for adapting different rates of data transfer between a CPU and a disk drive to correspond to a selected data transfer rate comprising:
   generating a first clock signal and a second clock signal, said first clock signal and said second clock signal being derived from a single oscillator;
   generating a first set of intermediate signals in accordance with the selected data transfer rate, said first set of intermediate signals being synchronous with said first clock signal;
   generating a second set of intermediate signals concurrent with said first set of intermediate signals in accordance with the selected data transfer rate, said second set of intermediate signals being synchronous with said second clock signal; and combining signals of said first set of intermediate signals and said second set of intermediate signals to create a set of disk drive control signals adapted for the selected data transfer rate.

5. The method of claim 4 wherein said second clock signal is of like frequency and opposite phase with respect to said first clock signal.

6. A method for controlling different rates of data transfer between a CPU and a disk drive in a computer system comprising:
    generating a first clock signal and a second clock signal, said first clock signal and said second clock signal being derived from a single oscillator;
    generating a rate signal representative of a selected data transfer rate;
    generating a first intermediate signal in response to said rate signal, said first intermediate signal being synchronous with said first clock signal;
    generating a second intermediate signal in response to said rate signal, said second intermediate signal being synchronous with said second clock signal, said second intermediate signal being generated in parallel with said first intermediate signal; and
    combining said first intermediate signal and said second intermediate signal to generate disk drive control signals for said selected data transfer rate.

7. The method of claim 6 wherein said second clock signal is of a same frequency and opposite phase as said first clock signal.

8. In a computer system having a CPU and a disk drive and means for selecting one of a plurality of rates of data transfer between the CPU and the disk drive, means for adapting different rates of data transfer between the CPU and the disk drive to correspond to a selected data transfer rate comprising:
    means for generating a first clock signal and a second clock signal, said first clock signal and said second clock signal being derived from a single oscillator;
    latch means responsive to the selecting means for generating a rate signal representative of the selected data transfer rate;
    first logic means responsive to said rate signal and driven by said first clock signal for generating a first set of intermediate signals in accordance with the selected data transfer rate and synchronous with said first clock signal;
    second logic means responsive to said rate signal and drive by said second clock signal for generating a second set of intermediate signals in accordance with the selected data transfer rate and synchronous with said second clock signal, said second logic means being operable in parallel with said first logic means; and
    means for combining signals of said first set of intermediate signals and said second set of intermediate signals to create a set of disk drive control signals adapted for the selected data transfer rate.

9. A method for accommodating two or more rates of data transfer between a processor and a disk drive comprising:
    driving a single oscillator to generate at least first and second clock signals, said second clock signals of opposite phase with respect to said first clock signals;
    generating a first set of intermediate signals compatible with a selected data transfer rate, said first set of intermediate signals being synchronous with said first clock signal;
    generating a second set of intermediate signals compatible with said selected data transfer rate, said second set of intermediate signals being synchronous with said second clock signal and being generated in parallel with said first set of intermediate signals; and
    combining at least a part of each of said first and second sets of intermediate signals to create disk control signals adapted for accessing said disk drive at said selected rate.

10. A method for providing data transfer between a processor and a disk drive in a computer system comprising:
    generating first and second clock signals from a single oscillator, said second clock signals of opposite phase with respect to said first clock signals;
    generating a first intermediate signal synchronous with said first clock signal;
    generating a second intermediate signal synchronous with said second clock signal said second intermediate signal being generated in parallel with said first intermediate signal; and
    combining said first and second intermediate signals to generate disk drive control signals for a selected data transfer rate.

* * * * *